(12) United States Patent  (10) Patent No.: US 7,489,413 B2
Nakatsu et al.  (45) Date of Patent: Feb. 10, 2009

(54) APPARATUS HAVING MEANS FOR PRINTING VIDEO SIGNALS OF VIDEO CAMERA ATTACHED THERETO

(75) Inventors: Yutaka Nakatsu, Tokyo (JP); Shin Iima, Tokyo (JP); Kayoko Ohyoshi, Tokyo (JP); Tomomi Nakamura, Tokyo (JP)

(73) Assignee: Sony Corporation (JP)

( * ) Notice: Subject to any disclaimer, the term of this patent is extended or adjusted under 35 U.S.C. 154(b) by 894 days.

(21) Appl. No.: 10/883,817

(22) Filed: Jul. 6, 2004

(65) Prior Publication Data

US 2004/0239989 A1 Dec. 2, 2004

Related U.S. Application Data

(63) Continuation of application No. 08/610,758, filed on Mar. 5, 1996.

(30) Foreign Application Priority Data

Mar. 7, 1995 (JP) ............................... P07-047577

(51) Int. Cl.
*G06F 15/00* (2006.01)
*G06K 1/00* (2006.01)
(52) U.S. Cl. ..................... 358/1.1; 358/296; 348/207.2; 348/333.02; 348/375; 400/83
(58) Field of Classification Search ................ 358/1.15, 358/1.16, 503, 1.1, 296; 386/46, 108; 348/207.1, 348/207.2, 333.02, 373–376; 400/83
See application file for complete search history.

(56) References Cited

U.S. PATENT DOCUMENTS

| | | | | |
|---|---|---|---|---|
| 4,507,689 | A | * | 3/1985 | Kozuki et al. ............... 386/108 |
| 4,827,347 | A | | 5/1989 | Bell |
| 4,859,092 | A | * | 8/1989 | Makita ........................ 400/83 |
| 4,935,763 | A | | 6/1990 | Itoh et al. |
| 4,937,676 | A | * | 6/1990 | Finelli et al. ................. 348/375 |
| 5,170,262 | A | | 12/1992 | Kinoshita et al. |
| 5,528,285 | A | | 6/1996 | Morikawa et al. |
| 5,559,554 | A | * | 9/1996 | Uekane et al. .......... 348/333.02 |
| 5,561,462 | A | | 10/1996 | Nagano |

(Continued)

FOREIGN PATENT DOCUMENTS

JP 06-303559 10/1994

(Continued)

*Primary Examiner*—Edward L Coles
*Assistant Examiner*—Satwant K Singh
(74) *Attorney, Agent, or Firm*—Rader Fishman & Grauer PLLC; Ronald P. Kananen

(57) ABSTRACT

A video printer (1) comprises a video printer housing portion (2), and a video camera station (3) disposed on a rear upper portion of the video printer housing portion (2) and having a signal input and output connection terminal (4). A video camera (6) with a liquid-crystal display monitor (7) is electrically connected to the connection terminal (4), and attached to the video printer (1) at its video camera station (3) so that, when the video printer (1) is in use, a user can operate the video camera (6) and the video printer (1) by operating systems (8), (9) disposed on the video printer (1) while visually confirming a picture displayed on a picture screen of the liquid-crystal display monitor (7).

14 Claims, 4 Drawing Sheets

U.S. PATENT DOCUMENTS

| | | | |
|---|---|---|---|
| 5,581,362 A | 12/1996 | Sakaue et al. | |
| 5,606,420 A * | 2/1997 | Maeda et al. | 358/296 |
| 5,606,431 A * | 2/1997 | Park | 358/503 |
| 5,621,492 A | 4/1997 | Beveridge et al. | |
| 5,621,868 A | 4/1997 | Mizutani et al. | |
| 5,636,315 A | 6/1997 | Sugiyama et al. | |
| 5,926,285 A * | 7/1999 | Takahashi | 358/296 |
| 6,074,111 A | 6/2000 | Kasahara | |
| 6,091,881 A | 7/2000 | Kamikubota | |
| 6,674,538 B2 * | 1/2004 | Takahashi | 358/1.15 |
| 6,687,453 B1 * | 2/2004 | Sakamoto et al. | 386/46 |
| 6,937,356 B1 * | 8/2005 | Ito et al. | 358/1.16 |
| 7,271,930 B2 * | 9/2007 | Ito et al. | 358/1.16 |
| 7,283,158 B1 * | 10/2007 | Shiohara et al. | 348/207.1 |
| 7,298,515 B2 * | 11/2007 | Takahashi | 358/1.15 |
| 2003/0007168 A1 | 1/2003 | Takahashi | |

FOREIGN PATENT DOCUMENTS

| | | |
|---|---|---|
| JP | 06-311467 | 11/1994 |
| JP | 06311317 | 11/1994 |
| JP | 06311467 | 11/1994 |
| JP | 06-336889 | 12/1994 |
| JP | 06-343147 | 12/1994 |
| JP | 07131743 | 5/1995 |

* cited by examiner

APPARATUS HAVING MEANS FOR PRINTING VIDEO SIGNALS OF VIDEO CAMERA ATTACHED THERETO

This is a continuation application of Ser. No. 08/610,758, filed on Mar. 5, 1996.

BACKGROUND OF THE INVENTION

The present invention relates to a video printer for printing a video signal of a video camera on a printing paper as a hard copy, and particularly to a video printer having a video printer housing portion with a video camera connected directly electrically thereto when the video printer is in use.

FIG. 1 of the accompanying drawings shows a manner in which a video printer is connected to a video camera in order to print a video picture of a video camera on a printing paper as a hard copy.

As shown in FIG. 1, a video printer 31 is connected to a video camera 32 through a signal input/output cord 33 from which video and audio signals, control signals, etc., are supplied to the video printer 31. The video printer 31 needs a television receiver 34 as a monitor receiver for displaying a video picture recorded by the video camera 32 on a picture screen of the television receiver in order for the user to visually confirm the manner in which the video printer 31 is operated. The television receiver 34 is connected to the video printer 31 through a signal input/output cord 35 accordingly.

In the system comprising the video printer 31, the video camera 32, and the television receiver 34, video picture from the video camera is —displayed on the picture screen of the television receiver 34. However, when the user wants to watch the video picture on the picture screen of the television receiver 34 in a step-by-step pictures, more of a still picture mode, the user has to operate the operation system of the video camera 32. When the user wants to print out video picture reproduced on the picture screen of the television receiver 34 on a printing paper as a hard copy by the video printer 31, the user has to operate the operation system of the video printer 31 while visually confirming video picture displayed on the picture screen of the television receiver 34.

As described above, when the user wants to make a hard copy of video picture by the video printer 31, the user has to operate the two operation systems of the video printer 31 and the video camera 32 independently, and hence the user tends to operate the above two operation systems by mistake. Moreover, the television receiver 34 is indispensable for the user to visually confirm a picture entered into the video printer 31 and the manner in which the video printer 31 is operated.

SUMMARY OF THE INVENTION

In view of the aforesaid aspect, it is an object of the present invention to provide a video printer with a video camera detachably attached thereto in which the user can operate a video printer and a video camera by use of an operation system disposed on the video printer.

According to an aspect of the present invention, there is provided a video printer for printing a video picture recorded by a video camera on a printing paper as a hard copy, which comprises a video printer housing portion with a video camera attached thereto, a signal input and output connection terminal disposed on the video printer housing portion for electrically connecting the video camera attached to the video printer housing portion to the video printer, and an operation system disposed on the video printer housing portion for operating the video camera.

The video camera is a video camera with a liquid-crystal display monitor, the video printer is operated while a video picture is entered into the video printer, and the manner in which the video printer is operated is visually confirmed on a picture screen of the liquid-crystal display monitor.

In the video printer with a video camera detachably attached thereto according to the present invention, the video camera is connected to the video printer housing portion through the connection terminals, thus enabling the video camera and the video printer to input and output signals therebetween. Then, the user can operate the video camera and the video printer by operating the operation system disposed on the video printer.

In the video printer with a video camera detachably attached thereto according to the present invention, if a video camera connected to the video printer through the connection terminals is a video camera having a liquid-crystal display monitor, then the user becomes able to operate a video picture on the liquid-crystal display monitor of the video camera by operating the operation system of the video printer, and can print out a reproduced video picture on a printing paper as a hard copy while visually confirming the video picture entered into the video printer by the liquid-crystal display monitor.

DETAILED DESCRIPTION OF THE DRAWINGS

A video printer with a video camera detachably attached thereto according to the present invention will be described with reference to the drawings.

Figure 1:
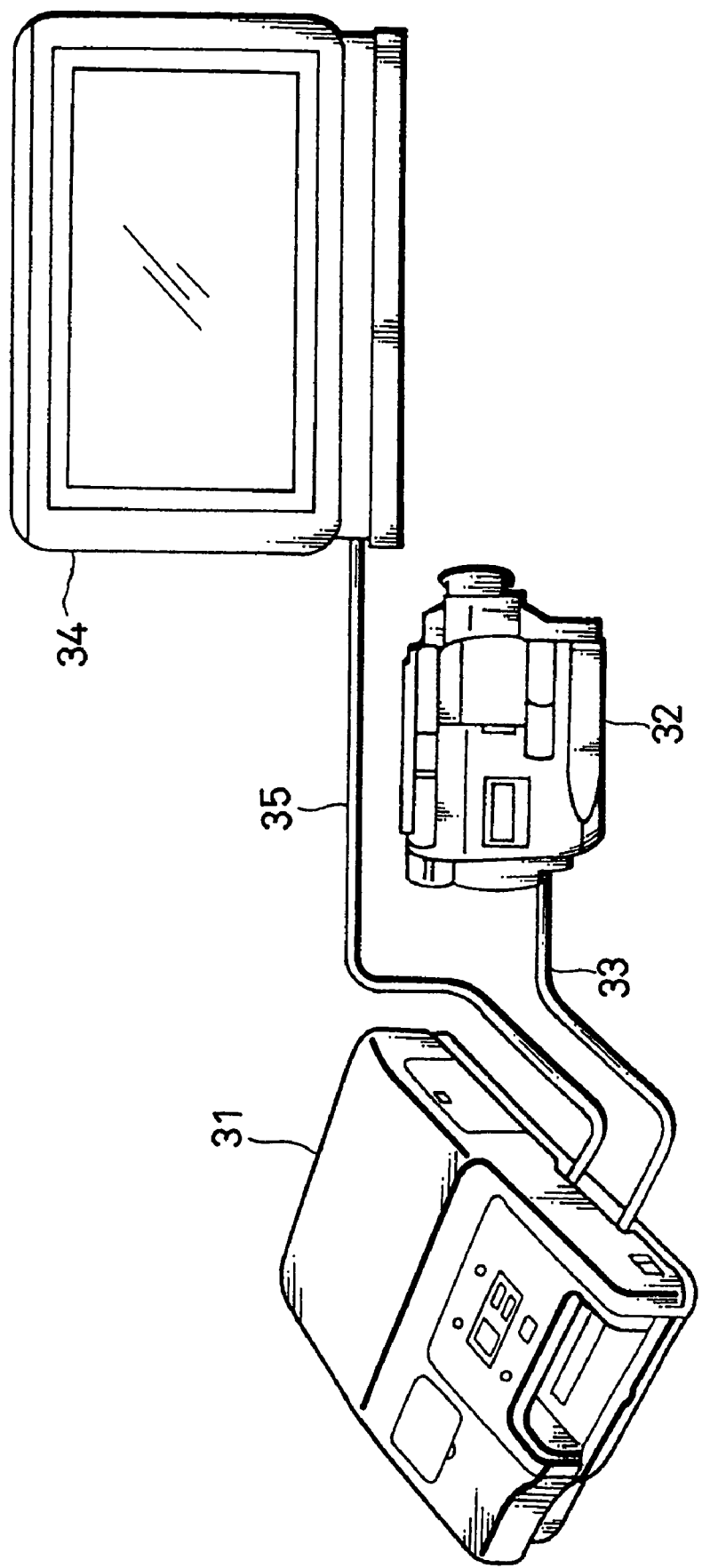
FIG. 1 is a perspective view illustrative of a manner in which a video printer, a video camera, and a television receiver are connected when the video printer is in use.
Figure 2:
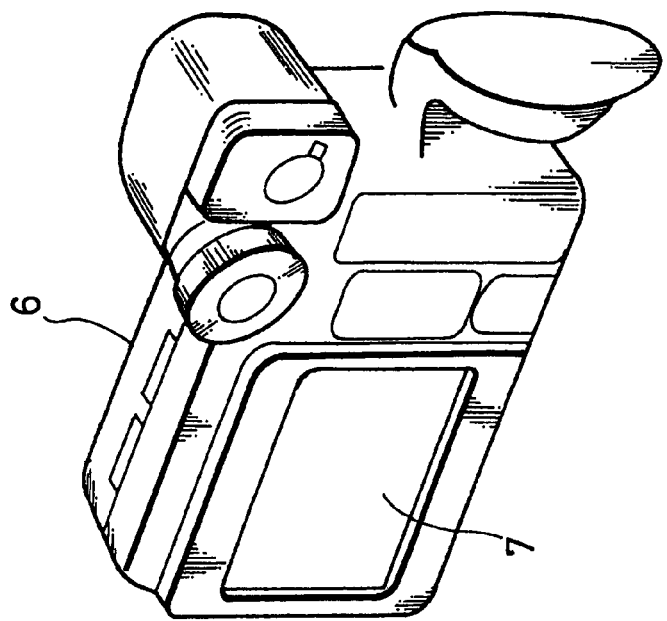
FIG. 2 is a perspective view illustrative of a manner in which a video printer and a video camera are not connected to each other.
Figure 2:
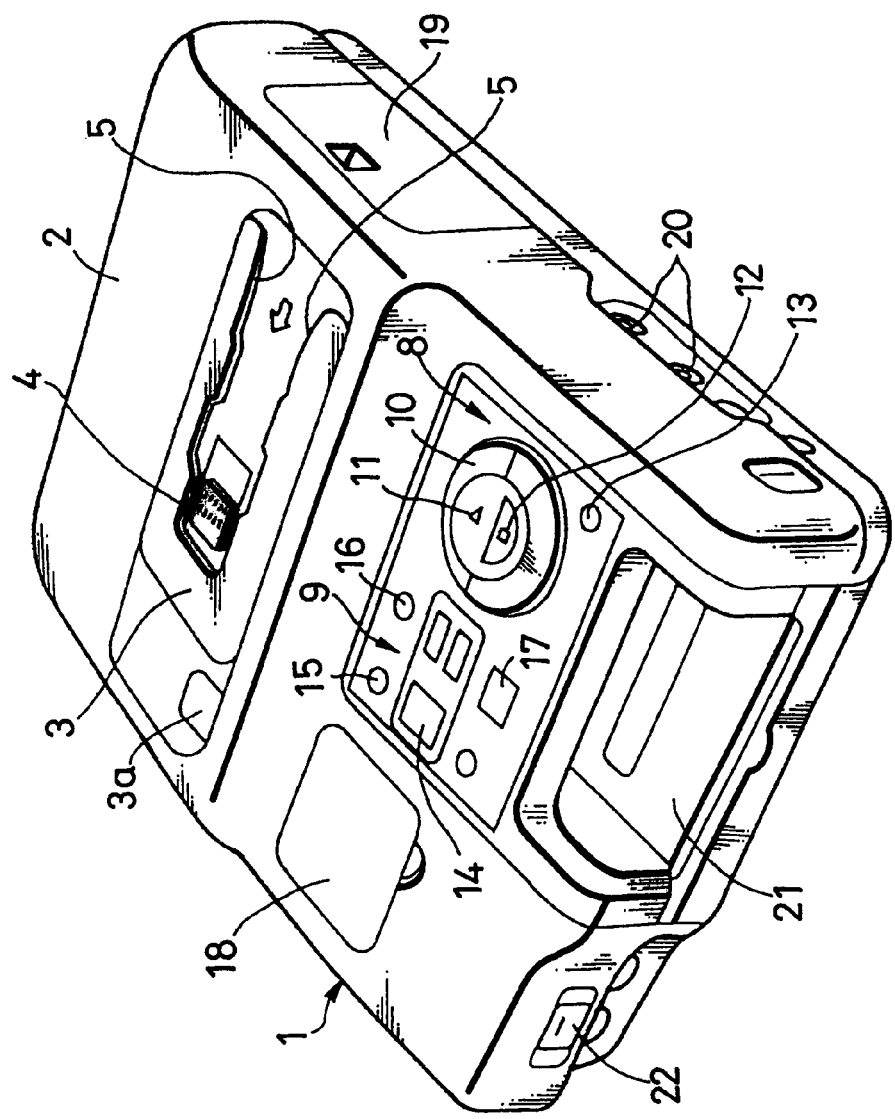

FIG. 2 is a perspective view illustrating a manner in which a video printer and a video camera are detached from each other when the video printer is not in use.

The video printer, generally denoted by reference numeral 1 in FIG. 2, includes a video printer housing portion 2 and a video camera station 3 provided at the rear upper surface of the video printer housing portion 2. The video camera station 3 of the video printer 1 holds and electrically mechanically connects a video camera, which will be described later on, to the video printer 1. The video camera station 3 includes a signal input/output terminal 4 composed of a plurality of contact groups as a connection terminal, and a pair of guide rails 5, 5 for slidably guiding the video camera from one side to the video camera station 3.

Figure 3:
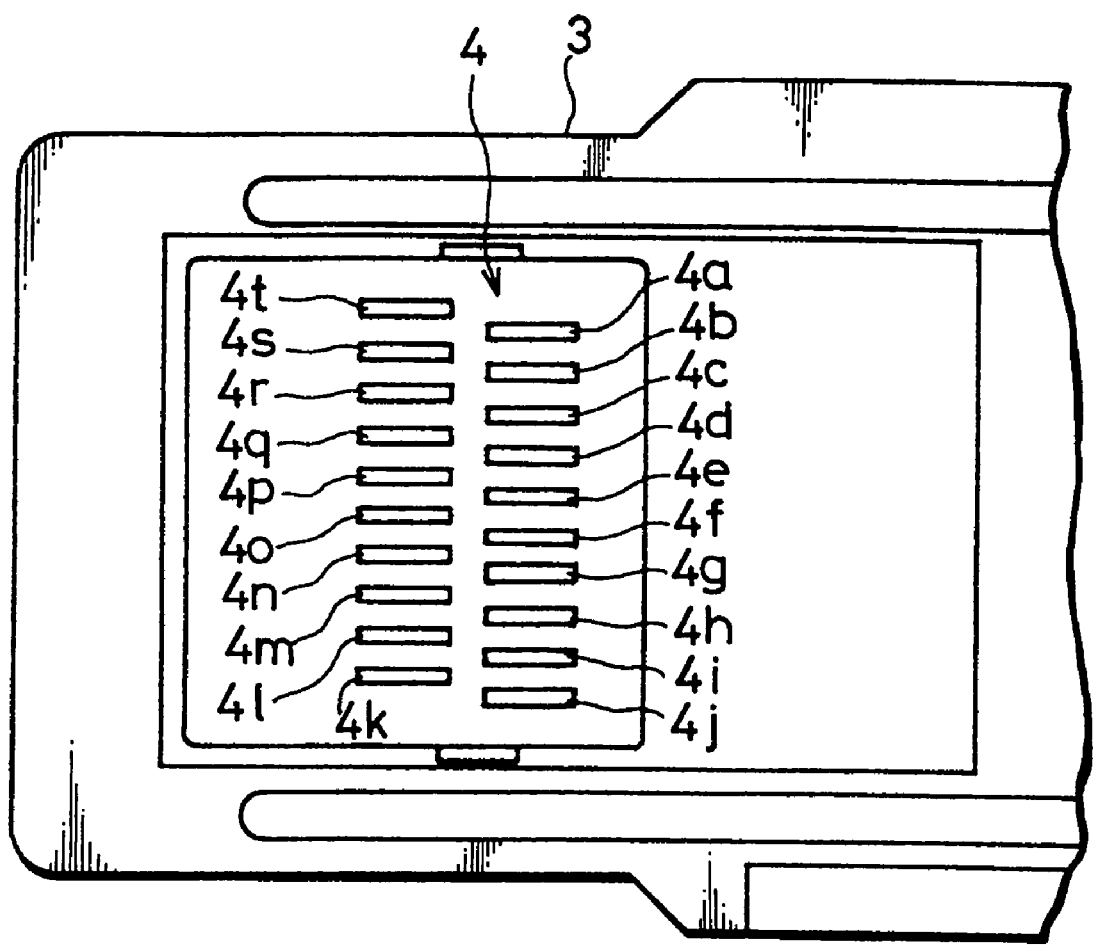
FIG. 3 is a fragmentary plan view illustrative of signal input/output connection terminals attached to a video camera station of a video printer.

FIG. 3 is a plan view illustrating the signal input/output terminal 4 in detail in an enlarged scale.

Figure 4:
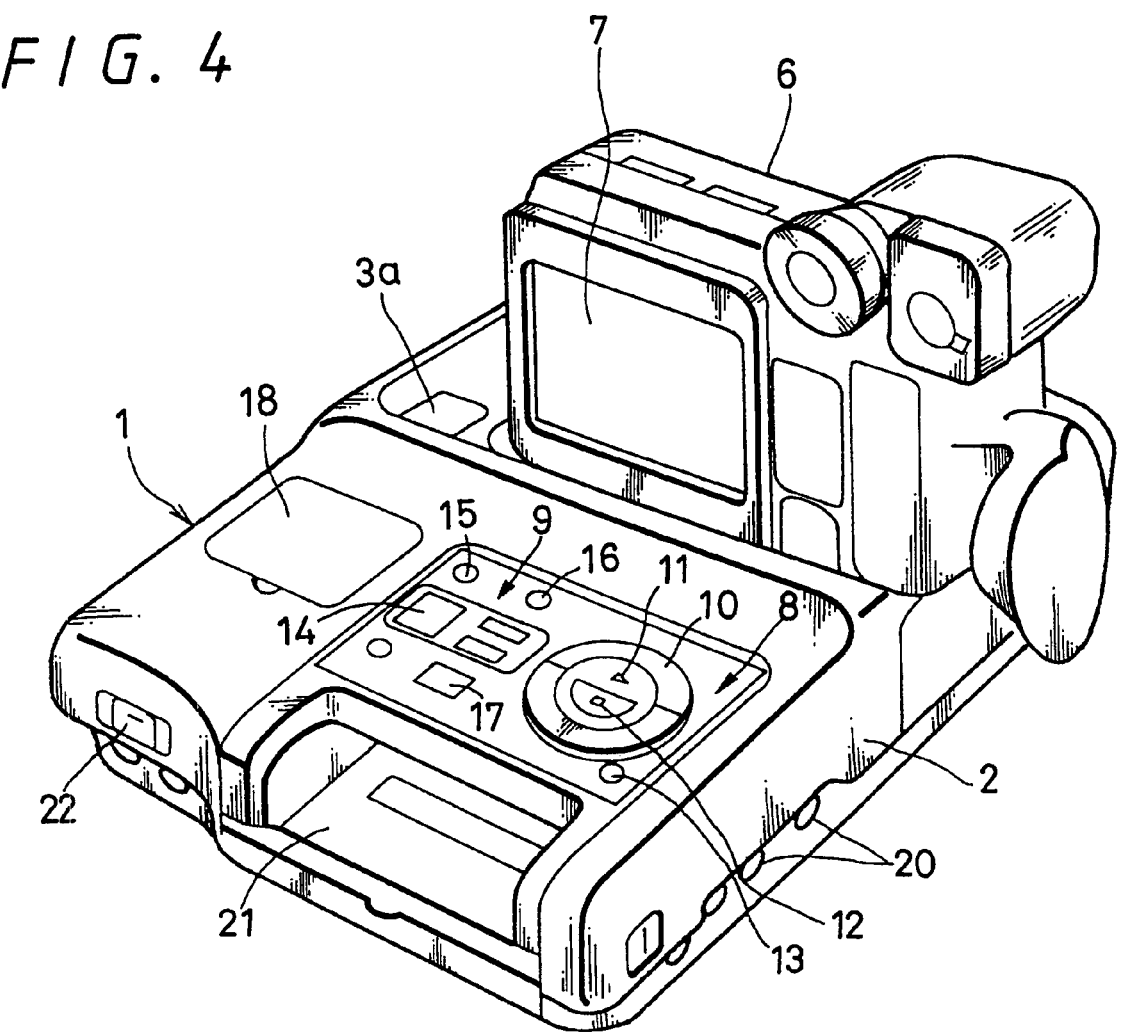
FIG. 4 is a perspective view illustrative of a manner in which a video camera is attached to a video printer.
Figure 5:
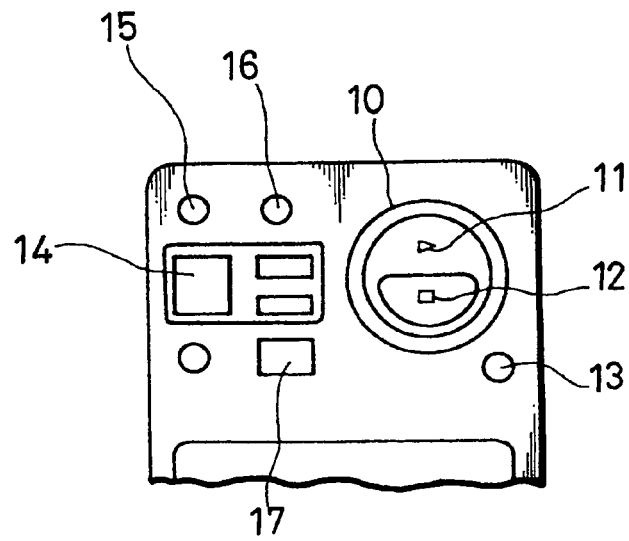
FIG. 5 is a fragmentary plan view illustrating a video camera operation system of a video printer.

As shown in FIG. 4, the contact terminal 4 comprises contact members 4a through 4t each having a spring action, and the contact members 4a through 4t are arranged in two columns, by way of example. Names of respective contact members 4a through 4t will be described below.

The contact member 4a is referred to as "S-terminal (Y luminance) OUT", the contact member 4b is "S-terminal (chroma) OUT", the contact member 4c is "video-OUT", the contact member 4d is "video-GND", the contact members 4e, 4f are "dead terminals", the contact member 4g is "audio-GND", the contact member 4h is "VTR control signal terminal", the contact member 4j is "VTR communication GND", the contact member 4k is "dead terminal", the contact members 4l, 4m, 4n and 4o are "power supply GND", the contact members 4p and 4q are "dead terminals", the contact members 4r and 4s are "power supplies", and the contact member 4t is "device detection signal terminal".

Referring back to FIG. 2, the video camera 6 applied to the present invention includes a liquid-crystal display monitor 7. Formed on the bottom surface of the video camera 6 is an electrode terminal (not shown) which electrically contacts the signal input/output terminal 4 of the video camera station 3 and a guide portion (not shown) which is engaged with the guide rails 5, 5 of the video camera station 3 for slidable movement.

FIG. 4 is a perspective view illustrating a manner in which the video camera 6 is attached to the video camera station 3 of the video printer 1, the video camera station 3 and the video camera 6 are electrically connected, and also the video camera station 3 and the video camera 6 are mechanically jointed in the locked state. In FIG. 4, when the user wishes to detach the video camera 6 from the video camera station 3, the user can release the locked state of the video camera 6 and detach the video camera 6 from the video printer housing portion 2 by depressing a button 3a on the video camera station 3.

An operation system 8 for operating the video camera 6 and an operation system 9 for operating the video printer 1 are disposed on the front upper surface side of the video printer housing portion 2.

The operation system 8 for operating the video camera 6 comprises a shuttle ring 10 for fast-forwarding or rewinding a video picture displayed on the picture screen of the liquid-crystal display monitor 7 of the video camera 6, a play button 11 integrally disposed at the central portion of the shuttle ring 10 for playing back a video picture on the picture screen of the liquid-crystal display monitor 7, and a stop button 12 integrally disposed at a part of the play button 11 for stopping the operation of the video camera 6. A pause button 13 is disposed in the vicinity of the shuttle ring 10 for temporarily placing a video picture in the state of a still picture.

The operation system 9 for operating the video printer 1 comprises a memory button 14 for storing a video picture of the video camera 6 in a memory (not shown) of the video printer 1, a memory picture button 15 for accessing the video picture stored in the memory of the video printer 1, an input picture button 16 for entering video data indicative of video picture into the memory of the video printer 1 and a print button 17 for energizing the video printer 1. The printer housing 2 includes a variety of setting buttons for setting various print conditions during printing, although not shown. When the video printer 1 is not in use, these setting buttons are covered with a lid 18.

As shown in FIG. 2, a print ink ribbon cassette loading portion 19 and video signal input and output terminals 20 are formed on a side portion of the video printer housing portion 2. A printing paper storage tray loading slot 21 and a power-supply switch 22 are disposed on the front portion of the video printer housing portion 2.

When the video printer 1 thus arranged is in use, the video camera 6 is mechanically attached to the video camera station 3 of the video printer housing portion 2, whereby the signal input and output terminal 4 of the video printer 1 and the electrode terminal (not shown) of the video camera 6 are connected electrically. Thus, the user can operate the video camera 6 by operating the operation system 8 of the video printer 1.

Specifically, when the user operates the play button 11 on the operation system 8, a video picture that has been recorded by the video camera 6 can be reproduced on the liquid-crystal display monitor 7. Moreover, when the user rotates the shuttle ring 10 in the clockwise direction, a reproduced picture is moved in the fast-forward mode. When the user rotates the shuttle ring 10 in the counter-clockwise direction, a reproduced picture can be moved in the rewind mode. Furthermore, when the user operates the pause bottom 13, a reproduced picture can be placed in the pause mode.

Accordingly, when the user prints out a video picture by the video printer 1, the user selects a video picture to be printed while operating the operation system 8 for the video camera 6, and the user can print out a selected video picture by operating the video printer 1 at its operation system 9 disposed near the operation system 8.

As described above, in the video printer 1 according to the present invention, the user can easily carry out a series of operations by operating the video camera operation system 8 disposed on the video printer 1 and the video printer operation system 9 also disposed on the video printer 1.

Further, the user can visually easily confirm the manner in which the video printer 1 is operated and a video picture inputted to the video printer 1 from a picture reproduced on the liquid-crystal display monitor 7 of the video camera 6. Therefore, the user can be prevented from operating the operation system 8 or 9 by mistake.

Furthermore, the video camera 6, the video printer 1 and the television receiver serving as the monitor receiver need not be connected via troublesome cords unlike the prior art. In addition, the television receiver need not be used as a monitor receiver.

In the above embodiment, the operation system 8 for the video camera 6 and the operation system 9 for the video printer 1 are disposed adjacent to each other on the video printer 1. However, the principle of the present invention is not limited thereto, and may similarly be applied to the arrangement where the operation systems 8 and 9 are spaced apart from each other so long as the video camera operation system 8 is disposed on the video printer housing portion 2.

As described above, since the video printer with the video camera detachably attached thereto includes the video printer housing portion with the signal input and output connection terminal electrically connected to the video camera and the video camera operation system disposed thereon, the user can easily operate the video camera on the video printer housing portion side.

Furthermore, the user can visually easily confirm the manner in which the video printer is operated and a video picture inputted to the video printer from a picture reproduced on the liquid-crystal display monitor of the video camera. Therefore, the user can be prevented from wrongly operating the operation system.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A camera apparatus comprising:
   a display device adapted to display a previously-recorded image;
   an electrode terminal electrically contactable with a signal input/output terminal of a printer, said image being transferable through said electrode terminal to said signal input/output terminal;
   a guide portion mechanically connectable to a guide rail of said printer,
   wherein said guide portion is on said display device, a button on said printer being depressible to release said display device from said guide rail,
   wherein said printer selects said image for exhibition on said display device as a displayed image, a hard copy reproduction of said displayed image being output from said printer.

2. A camera apparatus according to claim 1, wherein said display device is electrically and mechanically detachable from said printer.

3. A camera apparatus according to claim 2, wherein said display device is adapted to operate separate and apart from said printer.

4. A camera apparatus according to claim 1, wherein said guide rail is structurally adapted for guiding said display device onto said printer.

5. A camera apparatus according to claim 4, wherein said guiding said display device onto said printer connects said electrode terminal with said signal input/output terminal.

6. A camera apparatus according to claim 1, wherein said display device is a liquid-crystal display monitor.

7. A camera apparatus according to claim 1, wherein a control signal to select said image for exhibition on said display device is transferable through said signal input/output terminal to said electrode terminal.

8. A camera apparatus according to claim 1, wherein said printer includes a first memory button, said first memory button providing a control to store said image displayed on said display device within a recordable medium of said printer.

9. A camera apparatus according to claim 8, wherein said printer includes a second memory button, said second memory button providing a control to access said image that has been stored within said recordable medium of said printer.

10. A camera apparatus according to claim 1, wherein said signal input/output terminal includes a contact member, said contact member being in electrical contact with said display device to provide a signal between said printer and said display device.

11. A camera apparatus according to claim 10, wherein said signal input/output terminal includes another contact member, said another contact member being in electrical contact with said display device to provide power between said printer and said display device.

12. A camera apparatus according to claim 1, wherein said display device is a camera.

13. A camera apparatus according to claim 12, wherein said image is a still image.

14. A camera apparatus according to claim 12, wherein said image is from a continuous motion image stream.

* * * * *